United States Patent
Shoji et al.

[11] Patent Number: 6,141,501
[45] Date of Patent: Oct. 31, 2000

[54] FINDER DEVICE

[75] Inventors: Masao Shoji, Saitama; Katsuhiro Ohtake, Tokyo; Osamu Inaba, Tochigi, all of Japan

[73] Assignee: Fuji Photo Optical Co., Ltd., Omiya, Japan

[21] Appl. No.: 09/357,798

[22] Filed: Jul. 20, 1999

[30] Foreign Application Priority Data

Jul. 27, 1998 [JP] Japan .................................. 10-210901

[51] Int. Cl.[7] ............................ G03B 13/12; G03B 17/20
[52] U.S. Cl. ............................................ 396/296; 396/378
[58] Field of Search .................................... 396/380, 378, 396/373, 296

[56] References Cited

U.S. PATENT DOCUMENTS

| | | | |
|---|---|---|---|
| 4,400,071 | 8/1983 | Tamura et al. | 396/296 X |
| 5,592,252 | 1/1997 | Kobayashi et al. | 396/380 |

FOREIGN PATENT DOCUMENTS 6-82882  3/1994  Japan .

*Primary Examiner*—W. B. Perkey
*Attorney, Agent, or Firm*—Arnold International; Bruce Y. Arnold

[57] ABSTRACT

A finder device is disclosed wherein light from an objective optical system passes through a finder frame to an eyepiece. The finder frame includes two spaced-apart support pins, a screen format switchable mask mounted to the support pins so as to enable a particular screen format to be selected from among at least two alternative screen formats, and a mask pressure plate which is mounted to the support pins so as to retain the screen format switchable mask on said support pins. Markings, useful for taking photographs, are provided on the transparent region of the screen format switchable mask or on the mask pressure plate. In this manner, markings useful for taking photographs, which be viewed with an object to be photographed when looking through the eyepiece of the finder, can be manufactured with less expense and fewer defects than previously.

9 Claims, 5 Drawing Sheets

FINDER DEVICE

BACKGROUND OF THE INVENTION

Generally, with a conventional finder device of a camera, and in particular, with a lighting format finder device such as is shown in FIG. 5, the light of a finder image which has passed through multiple lens elements of an objective lens 7 enters a roof prism 8. After the direction of travel has been changed by means of the roof prism 8, the light enters into a prism 9. After being reflected multiple times within the prism 9, the light passes through an eyepiece lens system 10 (shown herein as a single lens) and then exits the finder device. Between the roof prism 8 and the prism 9 is positioned a frame body 53 which is integrally attached to a finder frame main body 11. Frame body 53 includes two spaced-apart pins 14 which protrude from the frame body 53 on the side of the objective lens 7. On the two spaced-apart pins 14 are mounted a screen format switchable mask 16 which is held in place by a mask pressure plate 1.

The screen format switchable mask 16 is for switching the format of the image aperture, and is normally capable of switching to a standard format (C), a high format (H), and a panorama format (P). Such a screen format switchable mask is disclosed, for example, in Japanese Laid Open Patent Application H6-82882.

The light which passes through the roof prism 8 progresses by means of the screen format switchable mask 16 without any hindrance and is then transmitted to the prism 9. As illustrated in FIG. 6, on the surface of the light output side of the roof prism 8 is formed an auto focus target mark (AF) and a close range correction mark 44. The close range correction mark 44 is established such that it falls within the field of vision of the photographer when the object to be photographed is viewed through the eyepiece lens system 10 (FIG. 5).

In a conventional finder device constructed in the manner described above, the auto focus target mark AF and the close range correction mark 44 are formed on the surface of the light output side of the roof prism 8, and the operation of forming the auto focus target mark AF and the close range correction mark 44 on the roof prism 8 is such that the roof prism 8 itself may easily be broken during the process. As a result, there is a problem in that the defect rate is too high.

BRIEF SUMMARY OF THE INVENTION

The present invention relates to a finder device for use with a camera, and in particular relates to a finder device that can be easily and reliably constructed with a low defect rate.

The object of the present invention is to provide a finder device which can simplify the construction, yet still enable various marks, such as an auto focus target mark, a close range correction mark, and the like, to be visible in the finder device when viewing an object to be photographed.

BRIEF DESCRIPTION OF THE DRAWINGS

The present invention will become more fully understood from the detailed description given below and the accompanying drawings, which are given by way of illustration only and thus are not limitative of the present invention, wherein.

Similar components in the various figures are marked with identical reference characters for clarity.

DETAILED DESCRIPTION

In the present invention, in order to overcome the above-mentioned problems of prior art finder devices, the auto focus target mark AF, the close range correction mark, and so on, are not formed on the surface of the light output side of the roof prism. Instead, these marks are displayed within the finder device by being formed on a field of vision frame or on a mask pressure plate, the marks being formed on these elements so that they are visible superposed with the finder image of an object to be photographed when viewed through the eyepiece of the finder.

In the present invention the finder image is transmitted to the eyepiece (or eyepiece lens system) following its entry into the objective lens system through the mask pressure plate, the screen format switchable mask, and the field of vision frame. In addition, since the marks are formed on the field of vision frame or on the mask pressure plate, they can be viewed superposed with the finder image when looking through the eyepiece lens system.

Two embodiments of the invention will now be discussed with reference to the drawings.

Embodiment 1

Figure 1:
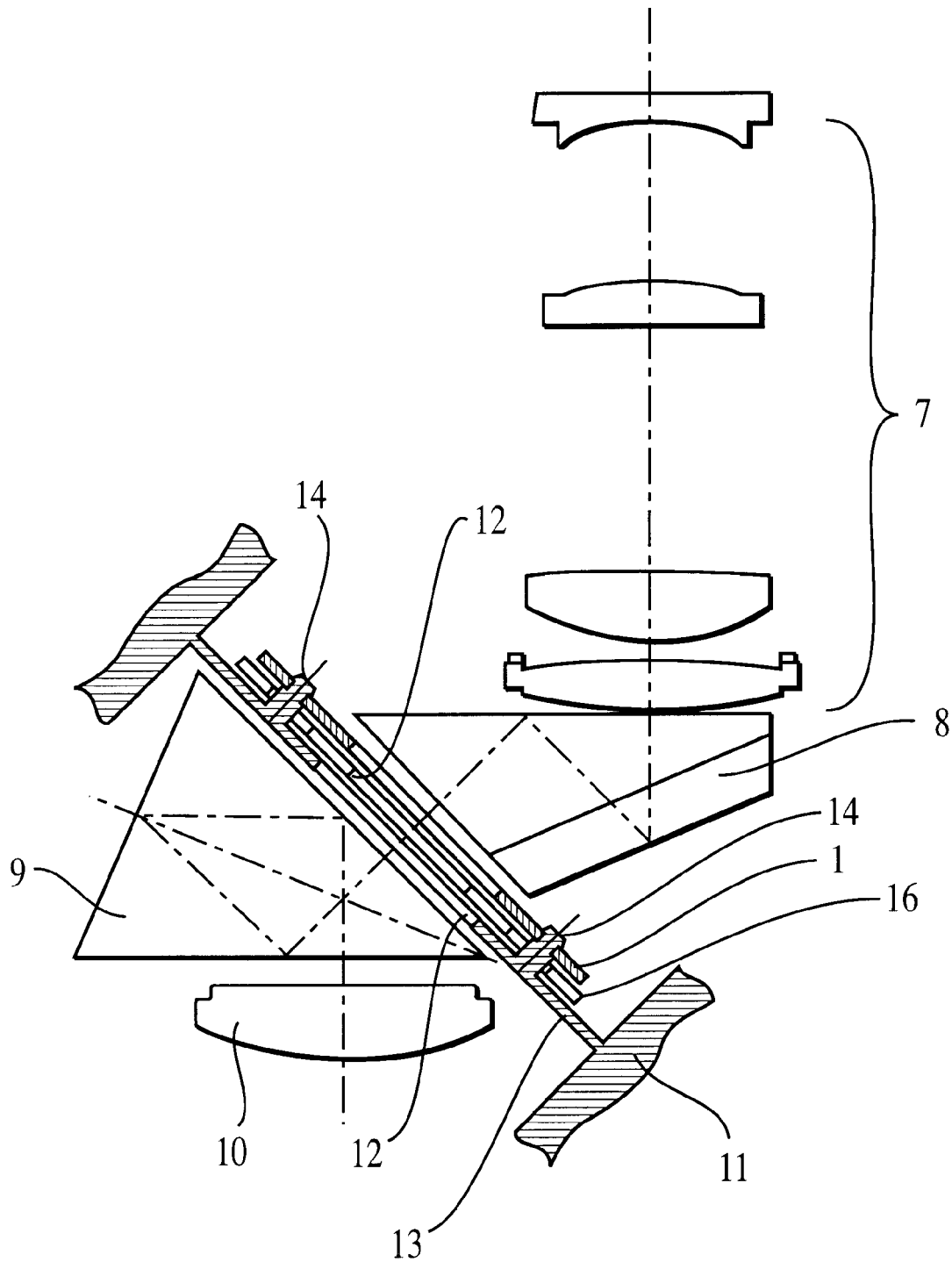
FIG. 1 shows a first embodiment of a finder device according to the present invention.
Figure 2:
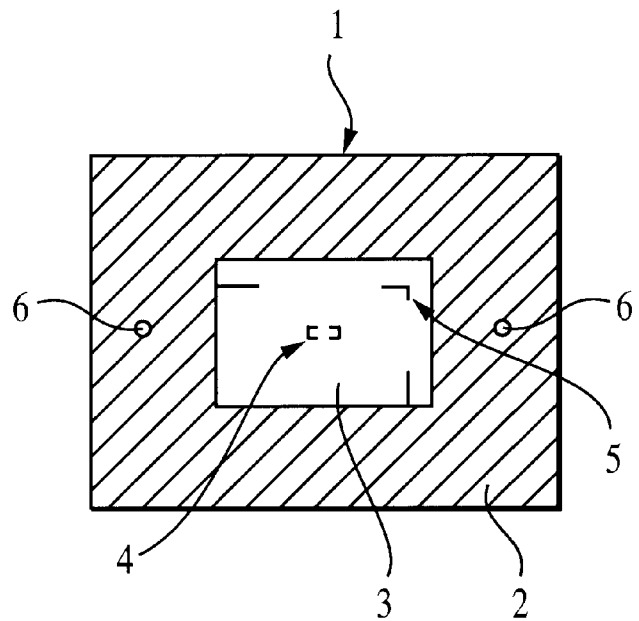
FIG. 2 is an enlarged explanatory diagram of the mask pressure plate used in FIG. 1.

FIGS. 1 and 2 show a finder device according to a first embodiment of the present invention. FIG. 1 is an overall view of the finder device, and FIG. 2 is an enlarged explanatory drawing of the mask pressure plate 1 shown in FIG. 1.

In the finder device according to Embodiment 1, a mask pressure plate 1, as best shown in FIG. 2, is used. On the mask pressure plate 1, a non-transparent part 2 is formed by printing in the margin of the mask pressure plate so that a central aperture 3 is formed. Furthermore, in this embodiment an auto focus target mark 4 and a close range correction mark 5 are printed on the transparent part of the mask pressure plate within the central aperture 3. Furthermore, holes 6 are cut through the non-transparent part 2, so that the mask pressure plate 1 can be mounted on two spaced-apart pins 14 (FIG. 1). The mask pressure plate 1 in this embodiment thus serves to support the marks that previously were placed on the prism 8, and also serves its normal function of retaining the screen format switchable mask 16 on the finder frame 13.

The screen format switchable mask 16 forms an aperture 12, the size of which can be varied to change viewing formats as in U.S. Pat. No. 5,592,252 (the disclosure of which is wherein incorporated by reference). The aperture 12 is variable by means of an operating pole (not shown) which enables the screen format (i.e., the size and shape of aperture 12) to be switched. Furthermore, the mask pressure plate 1 is secured by the two spaced-apart pins 14 which pass through the holes 6 in the mask pressure plate 1. By this means, the screen format switchable mask 16 (FIG. 1) is retained adjacent the finder frame 13 by the mask pressure plate 1. An auto focus target mark 4 (FIG. 2) and a close range correction mark 5 are formed on one surface of the mask pressure plate 1. With the finder frame 13 (FIG. 1) and its associated components assembled in the manner described above, the aperture 12 of the central part of the screen format switchable mask 16 is variable.

Thus, in the finder device as described above, the auto focus target mark 4 and the close range correction mark 5 are each formed on a surface of the mask pressure plate 1 instead of on the light output side of the roof prism 8 and can be seen with the object to be photographed when looking through the finder.

Embodiment 2

Figure 4:
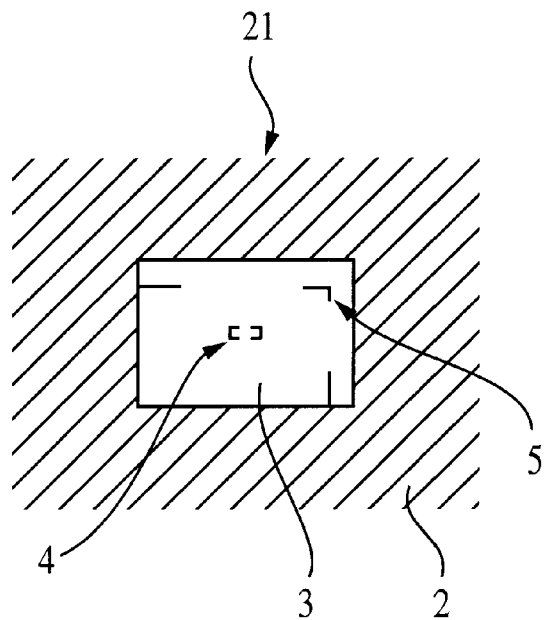
FIG. 4 is an enlarged explanatory diagram of a center portion of the field of vision frame used in FIG. 3.
Figure 3:
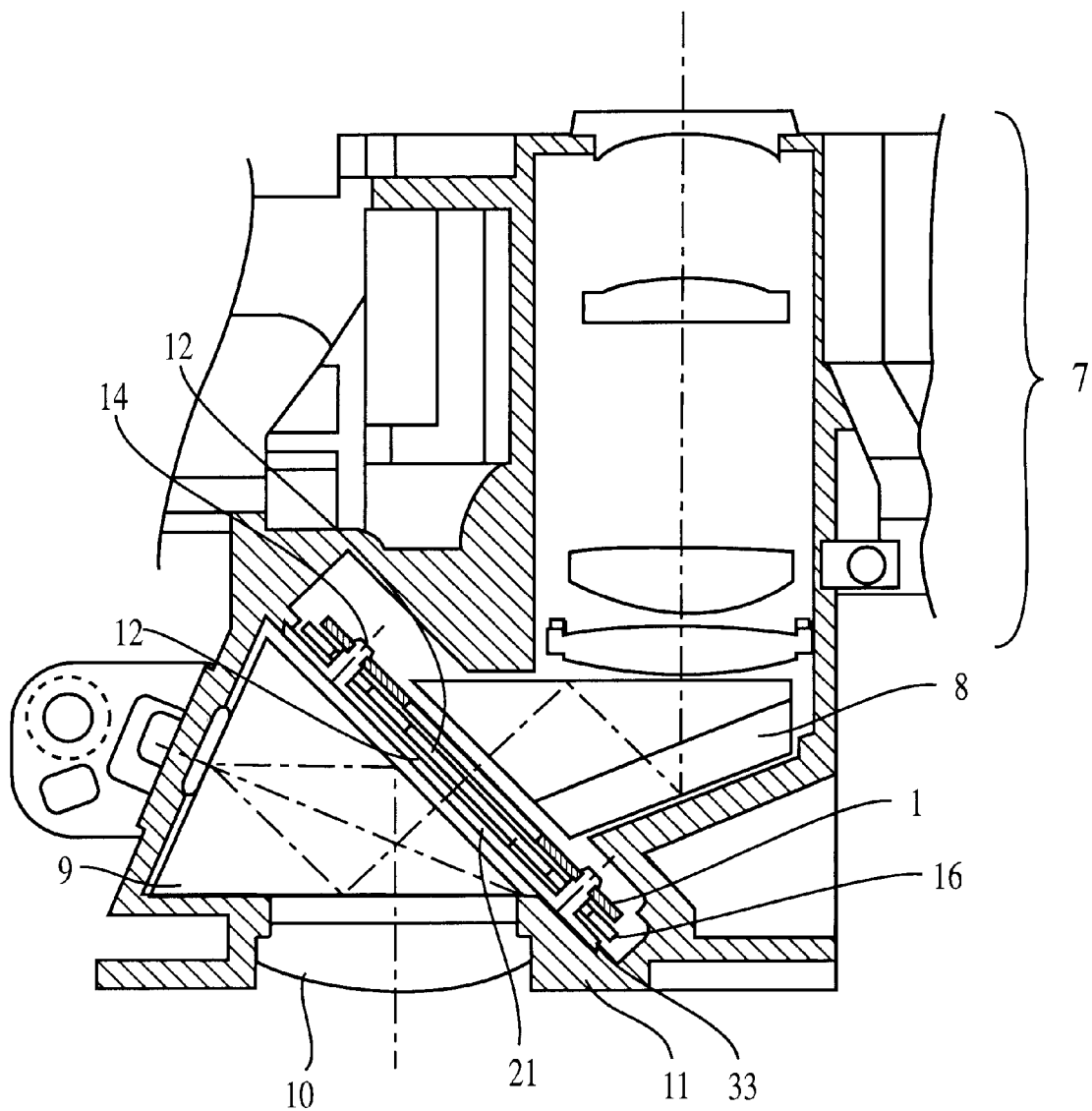
FIG. 3 shows a second embodiment of a finder device according to the present invention.
Figure 5:
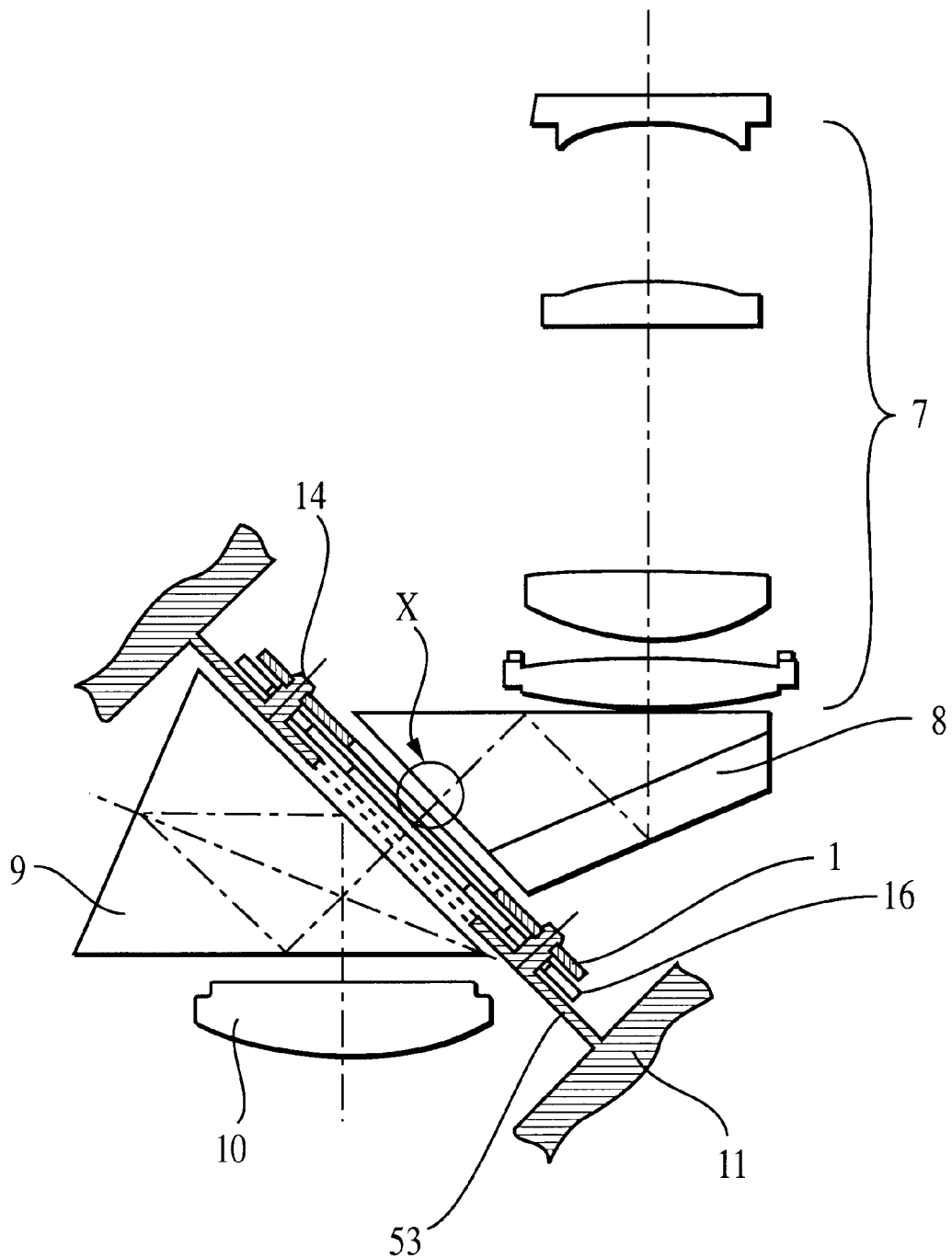
FIG. 5 shows a conventional finder device.
Figure 6:
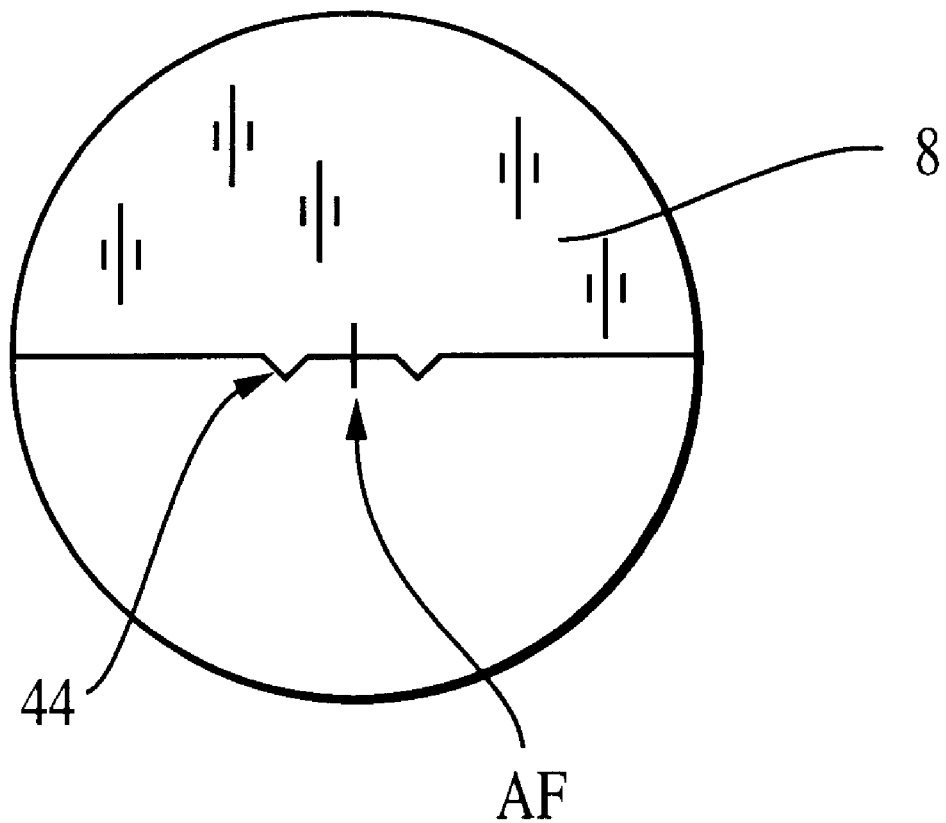
FIG. 6 is an enlarged explanatory diagram of the portion within the circle labeled X in FIG. 5.

In FIGS. 3 and 4 are shown another embodiment of a finder device according to the present invention, wherein FIG. 3 is an overall view of a finder device of Embodiment 2, and FIG. 4 is an enlarged explanatory diagram of a field of vision frame for this embodiment.

With the finder device of this embodiment, a field of vision frame 21, as best shown in FIG. 4, is made by printing in the margin (thus forming non-transparent part 2). Furthermore, by printing on the rear surface side of the transparent part 3, an auto focus target mark 4, a close range correction mark 5, etc., can be created. The scale of FIG. 4 is larger than the scale of FIG. 2, and thus an outer boundary as well as the region corresponding to holes 6 are outside the boundary of what is illustrated in FIG. 4.

A finder device having a field of vision frame 21 constructed in the manner illustrated in FIG. 4 is shown in FIG. 3. In FIG. 3, light of a photographic object which has passed through the objective lens system 7 has its direction changed by means of the roof prism 8, enters into the prism 9 where, after being reflected multiple times, it then enters the eyepiece lens system 10. Between the roof prism 8 and the prism 9 is positioned the field of vision frame 21 on which there is printing in the margin. Field of vision frame 21 is mounted within a center aperture of the finder frame 33. Two spaced-apart pins 14 protrude toward the objective side from the finder frame 33 and support the screen format switchable mask 16 as well as the mask pressure plate 1. In this embodiment, no marks are formed on mask pressure plate 1. Instead, as illustrated in FIG. 4, auto focus target mark 4, as well as close range correction mark 5, are formed on the field of vision frame 21 (FIG. 3). As before, the screen format switchable mask 16 is supported on the two spaced-apart pins 14 attached to the finder frame 33. Also as before, on the two spaced apart pins 14, is attached a mask pressure plate in which holes are cut which correspond in location to the two spaced-apart pins 14, thereby enabling the mask pressure plate to be mounted onto the two spaced-apart pins 14 so as to prevent the screen format switchable mask 16 from becoming separated from the finder frame 33.

Furthermore, by means of an operating pole (not shown in the drawing), the screen format (i.e., the size and shape of the central aperture 12), can be switched in the manner disclosed in U.S. Pat. No. 5,592,252. Thus, the size and shape of the aperture 12 of the screen size switchable mask 16 is variable.

With a finder device which has been assembled with a field of vision frame 21 in the manner described above, the light of the finder image passes through the objective lens system 7, is reflected by the roof prism 8 and, after a change in direction, passes to the eyepiece lens system 10. As illustrated in FIG. 4, since an auto focus target mark 4 and a close range correction mark 5 are formed by printing in the transparent part 3 of the field of vision frame 21, one can see these marks superposed with an object to be photographed when looking through the finder.

Thus, by means of the construction referred to above, the present invention enables the display of various marks on the mask pressure plate without forming the marks on the prism itself. By this means, various desired marks can be easily displayed within the finder, enabling the construction of the finder to be less expensive and more reliable than previously.

The invention being thus described, it will be obvious that the same may be vaned in many ways. For example, the specific types and locations of marks to be formed will vary depending on the application. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A finder device for use with a camera, said finder device comprising:

an objective optical system;

a finder frame; and, an eyepiece;

wherein said finder frame has an aperture therein to pass light from said objective optical system to said eyepiece, said finder frame including two support pins, one positioned opposite the other, with said aperture positioned between said support pins;

a screen format switchable mask is mounted to said support pins so as to enable a particular screen format to be selected from among at least two alternative screen formats, with each screen format having a transparent region within an opaque border;

a mask pressure plate which is mounted to said support pins so as to retain the screen format switchable mask on said support pins; and markings, useful for taking photographs, are provided on a transparent region of a field of vision frame that is positioned within said aperture of the finder frame, or are provided on said mask pressure plate, so that said markings are visible with an image of an object when the object is viewed through said eyepiece.

2. The finder device of claim 1, wherein said markings are provided on said transparent region of the field of vision frame.

3. The finder device of claim 1, wherein said markings are provided on the mask pressure plate.

4. The finder device of claim 1, wherein said markings include an auto focus target mark.

5. The finder device of claim 1, wherein said markings include a close range correction mark.

6. In a finder frame of a finder device for use in taking photographs with a camera, the improvement of including markings on a field of vision frame that is supported within an aperture of said finder frame, said finder frame including two spaced-apart pins which support a screen format switchable mask that enables the screen format to be switched, said markings being located so as to be visible when looking through the finder device at an object to be photographed.

7. In a mask pressure plate of a finder device for use in taking photographs with a camera, the improvement of providing said mask pressure plate with markings that are useful in taking photographs, said markings being positioned so that the markings are visible when looking through the finder device at an object to be photographed, said mask pressure plate including at least two holes therein for mounting said mask pressure plate on two-spaced apart pins of said finder device.

8. A finder device for use with a camera, said finder device comprising:

an objective optical system;

a finder frame; and, an eyepiece;
wherein
- said finder frame has an aperture therein to pass light from said objective optical system to said eyepiece, said finder frame including two supports, one positioned opposite the other, with said aperture positioned between said supports;
- a screen format switchable mask is mounted to said supports so as to enable a particular screen format to be selected from among at least two alternative screen formats, with each screen format having a transparent region within an opaque border;
- a mask pressure plate which is mounted to said supports so as to retain the screen format switchable mask on said supports; and
- markings, useful for taking photographs, are provided on a transparent region of a field of vision frame that is positioned within said aperture of the finder frame, or are provided on said mask pressure plate, so that said markings are visible with an image of an object when the object is viewed through said eyepiece.

9. A finder device for use with a camera, said finder device comprising:
- an objective optical system;
- a finder frame; and,
- an eyepiece;
wherein
- said finder frame has an aperture therein to pass light from said objective optical system to said eyepiece, said finder frame including two support means, one positioned opposite the other, with said aperture positioned between said support means;
- a screen format switchable mask is mounted to said support means so as to enable a particular screen format to be selected from among at least two alternative screen formats, with each screen format having a transparent region within an opaque border;
- a mask pressure plate which is mounted to said support means so as to retain the screen format switchable mask on said support means; and
- markings, useful for taking photographs, are provided on a transparent region of a field of vision frame that is positioned within said aperture of the finder frame, or are provided on said mask pressure plate, so that said markings are visible with an image of an object when the object is viewed through said eyepiece.

* * * * *